United States Patent [19]
Ota et al.

[11] Patent Number: 5,492,678
[45] Date of Patent: Feb. 20, 1996

[54] GAS-CLEANING EQUIPMENT AND ITS USE

[75] Inventors: Hiroaki Ota; Daihei Kobayashi; Takeshi Yanobe; Fujio Sakamoto, all of Yokohama; Yuji Hayashi, Kawasaki, all of Japan

[73] Assignees: Hokushin Industries, Inc., Yokohama; Fujitsu Limited, Kawasaki, both of Japan

[21] Appl. No.: 278,069

[22] Filed: Jul. 20, 1994

[30] Foreign Application Priority Data

| | | | |
|---|---|---|---|
| Jul. 23, 1993 | [JP] | Japan | 5-183100 |
| Nov. 30, 1993 | [JP] | Japan | 5-299474 |
| Dec. 28, 1993 | [JP] | Japan | 5-336902 |
| May 11, 1994 | [JP] | Japan | 6-097783 |

[51] Int. Cl.$^6$ ............................................. F01N 3/10
[52] U.S. Cl. .................... 422/174; 422/173; 422/176; 422/177; 422/186; 422/186.04; 422/220; 422/906; 422/907; 60/275; 60/299; 219/121.43; 219/121.48; 416/241 R; 416/235; 416/238
[58] Field of Search ...................... 422/169–171, 422/173, 174, 176, 177, 178, 180, 186, 186.01, 186.04, 186.1, 186.07, 186.14, 186.2, 186.22, 186.12, 186.19, 907, 906, 224, 225, 220; 96/68, 150, 153, 154; 55/279; 60/275, 299, 315; 415/220, 146; 416/241 R, 235, 238; 219/121.43, 121.48

[56] References Cited

U.S. PATENT DOCUMENTS

| | | | |
|---|---|---|---|
| 3,285,709 | 11/1966 | Ennarino et al. | 60/275 |
| 3,957,392 | 5/1976 | Blackburn | 415/146 |
| 4,098,578 | 7/1978 | Stanton | 60/275 |
| 4,253,852 | 3/1981 | Adams | 55/279 |
| 4,318,894 | 3/1982 | Hensel et al. | 422/176 |
| 4,376,637 | 3/1983 | Yang | 60/275 |
| 4,427,418 | 1/1984 | Kogiso et al. | 422/178 |
| 4,717,806 | 1/1988 | Battey et al. | 219/121.43 |
| 4,954,320 | 9/1990 | Birmingham et al. | 422/186.04 |
| 5,098,671 | 3/1992 | Shiota | 422/186.07 |
| 5,196,670 | 3/1993 | Mantei | 219/121.43 |

FOREIGN PATENT DOCUMENTS

| | | | |
|---|---|---|---|
| 282831 | 9/1988 | European Pat. Off. | 416/241 R |

*Primary Examiner*—Robert J. Warden
*Assistant Examiner*—Hien Tran
*Attorney, Agent, or Firm*—Armstrong, Westerman, Hattori, McLeland & Naughton

[57] ABSTRACT

Gas-cleaning equipment is disclosed, which comprises a housing having an intake vent and an exhaust vent and having disposed between the two vents a fan having at least one rotating blade. Air pollutant-removing system using the gas-cleaning equipment is also disclosed. This gas-cleaning equipment can effectively clean a gas through the action of plasma produced by glow discharge caused by rotation of said fan. When a metal layer having a catalytic activity is fixed onto the surface of said rotating blade, this metal layer also functions to effectively clean the gas. In the case where both the plasma and the metal layer function to clean the gas, there can be obtained synergistic effects. Cleaning of the gas can be conducted with more efficiency by bringing the intake gas into contact with the fan in an oxygen-free state. A magnet provided as an outer wall of the housing serves to generate plasma with higher density, leading to more effective cleaning of the gas. As the metal layer showing catalytic activity, at least one noble metal selected from the group consisting of platinum, palladium, ruthenium and rhodium. This gas-cleaning equipment shows markedly excellent gas-cleaning ability considering its compact size, and can remove air pollutants particularly when applied to the exhaust system of automobiles or to outdoor structures such as buildings or props.

37 Claims, 7 Drawing Sheets

GAS-CLEANING EQUIPMENT AND ITS USE

BACKGROUND OF THE INVENTION

This invention relates to gas-cleaning equipment and its use. More particularly, it relates to gas-cleaning equipment for cleaning pollutant-contaminated gases discharged from factories and automobiles and to its use.

With the development of industrial technology, harmful pollutants contained in exhaust gases discharged from various factories have injured the health of the residents, have induced diseases of respiratory system such as asthma, and have caused atmospheric pollution, as is well known. In recent years, with the development of, particularly, the automobile industry, pollutant gases such as $CO_x$, $NO_x$, $SO_x$, etc. exhausted from automobiles, particularly, diesel engine automobiles have injured the health of residents along the roads and have caused atmospheric pollution. This has become a serious problem throughout the world, and measures against it have been urged.

As the measures, there have been proposed various exhaust gas-cleaning equipment including large-scale ones for exhaust gases discharged from factories and comparatively compact ones required for automobiles. In these conventional gas-cleaning equipment, it has been necessary to combine a plurality of comparatively large-sized equipment or use a large amount of a catalyst for the purpose of enhancing the ability of cleaning pollutants-contaminated gases, which in turn causes the problems that the cleaning equipment becomes too large and too expensive. Thus, there have been various proposals which are directed to reduce the size or cost of the equipment. One effective example thereof is a gas-cleaning equipment utilizing plasma discharge.

However, such proposals are still insufficient as to the level of the cleaning ability. The Administration cannot permit the present very slow progress of the measures against pollutant gases, and requires more advanced measures.

Under such circumstances, there has recently been proposed an effective gas-cleaning equipment in which a gas-cleaning technique utilizing a catalyst is combined with a gas-cleaning technique of utilizing plasma discharge ("Shingaku Gihou", 1993-01, Denshi Joho Tsushin Gakkai).

According to this report, a catalyst-plasma-reactor element using a reed switch is used for decomposing the pollutant gases such as $NO_x$, $SO_x$ and $CO_x$ to thereby effectively combine the catalytic action of Rh contact point metals with the gas-decomposing action of plasma generated by glow discharge for effectively attaining cleaning of pollutant-contaminated gases.

However, this report discloses only a fundamental theory of a system which can effectively clean pollutant-contaminated gases but does not disclose a specific structure of equipment realizing the theory.

SUMMARY OF THE INVENTION

It is, therefore, an object of the present invention to provide gas-cleaning equipment in which a catalyst and/or a plasma is used to synergistically clean various pollutant-contaminated gases.

Another object of the present invention is to provide gas-cleaning equipment which can clean an intake gas containing oxygen at a decreased level.

A further object of the present invention is to provide gas-cleaning equipment which is small-sized and yet shows excellent gas-cleaning ability.

A still further object of the present invention is to provide an air pollutant-removing system using the aforesaid gas-cleaning equipment.

Other objects, features and advantages of the present invention will become apparent from the detailed description of the preferred embodiments of the invention to follow.

Recognizing that the fundamental technique disclosed by the aforementioned report stands at the most advanced level in the prior art, the inventors have made intensive investigations to develop more effective gas-cleaning equipment and, as a result, have completed effectively gas-cleaning equipment in which an intake gas introduced into the passageway is subjected to a rotating fan to cause turbulence and generate glow discharge in a small gap between the rotating blade and the housing, said plasma functioning to clean the gas, and/or is brought into contact with a catalytic metal layer formed on the surface of the rotating blade and/or on the inside wall of the housing, with the contact area being increased by the turbulence.

Figure 1:
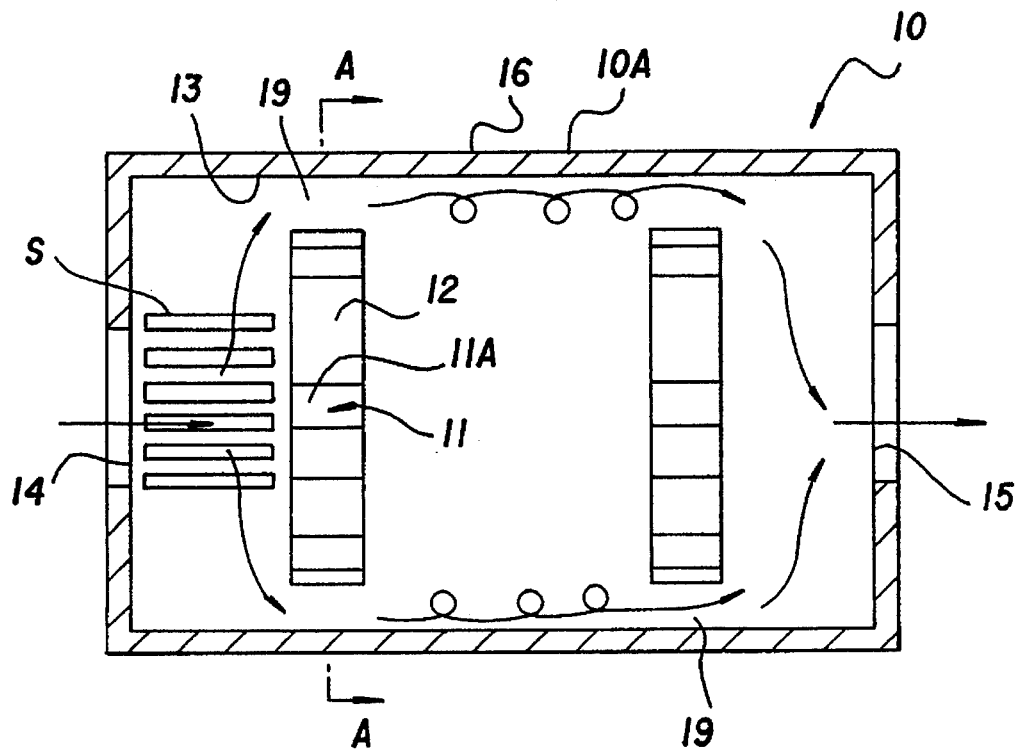
FIG. 1 is a sectional view showing one embodiment of the gas-cleaning equipment of the present invention.

In these figures, numeral 10 designates a housing, 11 a rotating blade, 12 a fan, 13 an inner side or wall, 14 an intake vent, 15 exhaust vent, 16 a first deoxidizing unit, 17 a magnet, 19 an electrode, 20 a deoxidizing mechanism, 22 a second deoxidizing unit, 25 a gas flow-changing member, 23 a cell, 28 a first valve (changing means), 30 a second valve (changing means), 32 an anode, 34 a cathode, and 58 gas-cleaning equipment.

DETAILED DESCRIPTION OF THE PREFERRED EMBODIMENTS OF THE INVENTION

That is, according to one aspect of the present invention, there is provided gas-cleaning equipment which comprises a housing having an intake vent and an exhaust vent and having at least one fan with at least one blade between said vents.

According to another aspect of the present invention, there is provided gas-cleaning equipment in which a gas flow-changing member having increasing outer diameter in the intake gas-traveling direction is provided on the intake vent side with respect to the rotating blade of the fan.

According to further aspect of the present invention, there is provided gas-cleaning equipment in which said gas flow-changing member is of a conical shape.

According to further aspect of the present invention, there is provided gas-cleaning equipment in which a plurality of rotating blades are provided on one and the same rotating shaft and rotate as one together with the shaft.

According to further aspect of the present invention, there is provided gas-cleaning equipment in which a plurality of rotating blades are provided on one and the same rotating shaft and each independently rotate from the shaft with relative rotation.

According to further aspect of the present invention, there is provided gas-cleaning equipment in which said rotating blade has a step-shaped cross section in the rotating direction.

According to further aspect of the present invention, there is provided gas-cleaning equipment in which said rotating blade has a right-left unsymmetrical plane form.

According to further aspect of the present invention, there is provided gas-cleaning equipment in which said rotating blade has a shape partly different in length.

According to further aspect of the present invention, there is provided gas-cleaning equipment in which at least two aforesaid features of the blade is combined.

According to further aspect of the present invention, there is provided gas-cleaning equipment in which said rotating blade has fixedly provided on its surface a metal layer having catalytic activity.

According to further aspect of the present invention, there is provided gas-cleaning equipment in which said metal layer is fixedly provided on at least one rotating blade in a state wherein a plurality of metals are laid bare.

According to further aspect of the present invention, there is provided gas-cleaning equipment in which different metals are fixedly provided respectively on at least two rotating blades as said metal layers.

According to further aspect of the present invention, there is provided gas-cleaning equipment in which said metal layer is formed by providing a plurality of metals in a layered state on at least one rotating blade.

According to further aspect of the present invention, there is provided gas-cleaning equipment in which the inside wall of said housing is of about a cylindrical shape.

According to further aspect of the present invention, there is provided gas-cleaning equipment in which the inside wall has an uneven surface.

According to further aspect of the present invention, there is provided gas-cleaning equipment in which the inside wall of said housing is slanted.

According to further aspect of the present invention, there is provided gas-cleaning equipment in which the metal layer having a catalytic activity is fixedly provided on the inside wall of said housing.

According to further aspect of the present invention, there is provided gas-cleaning equipment in which said metal layer fixedly provided on the inside wall is composed of a plurality of metals in a laid-bare state.

According to further aspect of the present invention, there is provided gas-cleaning equipment in which said metal layer fixedly provided on the inside wall is in a state wherein layers of a plurality of metals are layered one over the other.

According to further aspect of the present invention, there is provided gas-cleaning equipment in which said metal layer is fixedly provided on both the surface of the rotating blade and the inside wall of the housing.

According to further aspect of the present invention, there is provided gas-cleaning equipment in which a magnet layer is provided on the outer surface of said housing, an electrode (a) on the inside surface of said housing, and an electrode (b) on at least the tip of the blade facing the inside wall, and high frequency is applicable across said two electrodes to generate plasma with high density.

According to further aspect of the present invention, there is provided gas-cleaning equipment in which said fan is rotatable by the pressure of intake gas blown through the intake vent.

According to further aspect of the present invention, there is provided gas-cleaning equipment in which said fan is rotatable by a power source.

According to further aspect of the present invention, there is provided gas-cleaning equipment in which said metal layer is provided by fixing at least one noble metal selected from the group consisting of platinum, palladium, ruthenium and rhodium.

According to further aspect of the present invention, there is provided gas-cleaning equipment in which a deoxidizing mechanism is provided between said intake vent and said fan.

According to further aspect of the present invention, there is provided gas-cleaning equipment in which said deoxidizing mechanism is constituted by heatable wires.

According to further aspect of the present invention, there is provided gas-cleaning equipment in which said wires are in a meshed form.

According to further aspect of the present invention, there is provided gas-cleaning equipment in which said deoxidizing mechanism is constituted by pipes filled with silver powder and equipped with a heating means on the outer wall thereof.

According to further aspect of the present invention, there is provided gas-cleaning equipment in which said deoxidizing mechanism has an electrode structure wherein an outer electrode is made of stabilized zirconia, and an inner electrode is made of copper and is operated by sputtering phenomenon.

According to further aspect of the present invention, there is provided gas-cleaning equipment in which said deoxidizing mechanism is made of copper.

According to further aspect of the present invention, there is provided gas-cleaning equipment in which said deoxidizing mechanism is made of powdery copper.

According to further aspect of the present invention, there is provided gas-cleaning equipment in which said deoxidizing mechanism has a honeycomb structure composed of an assembly of a plurality of cells having a copper-plated inside wall.

According to further aspect of the present invention, there is provided gas-cleaning equipment which has: first and second deoxidizing units each containing the deoxidizing mechanism and having two passageways—one for receiving air pollutants-contaminated gas and the other for connecting to the pollutants-contaminated gas-cleaning unit; a changing means for selecting one of the first state wherein both passageways of said first deoxidizing unit are opened whereas both passageways of said second deoxidizing unit are closed and the second state wherein both passageways of said first deoxidizing unit are closed whereas both passageways of said second deoxidizing unit are opened; and at least one of a pressure-reducing means which reduces pressure of the second unit in the first state and reduces pressure of the first unit in the second state and a heating means which heats the second deoxidizing unit in the first state and heats the first deoxidizing unit in the second state.

According to further aspect of the present invention, there is provided gas-cleaning equipment in which said deoxidizing mechanism is reduced, after deoxidation treatment, by heat of the gas itself.

According to further aspect of the present invention, there is provided gas-cleaning equipment which has a hydrogen-supplying means provided with a hydrogen-occluding alloy and being capable of supplying hydrogen to the second deoxidizing unit in the first state from the hydrogen-occluding alloy and supplying hydrogen to the first deoxidizing unit in the second state from the hydrogen-occluding alloy.

According to further aspect of the present invention, there is provided gas-cleaning equipment in which said deoxidizing mechanism is constituted by an anode provided on the upstream side of the gas passageway, a cathode facing said anode, a means for applying an electric voltage across the anode and the cathode, and zinc, zinc oxide, indium or indium oxide provided between the anode and the cathode on the cathode side.

According to further aspect of the present invention, there is provided a gas-cleaning system for cleaning an exhaust gas from an engine, in which the gas-cleaning equipment is applied to the exhaust system of an industrial engine.

According to further aspect of the present invention, there is provided an air pollutants-contaminated gas-cleaning system in which the gas-cleaning equipment is applied to at least part of an outdoor building or props.

According to further aspect of the present invention, there is provided an air pollutants-contaminated gas-cleaning system in which the gas-cleaning equipment is applied to lighting fixtures lining a street.

According to further aspect of the present invention, there is provided an air pollutants-contaminated gas-cleaning system in which the gas-cleaning equipment is provided above a crossroads.

According to further aspect of the present invention, there is provided an air pollutants-contaminated gas-cleaning system in which the gas-cleaning equipment is provided in a chimney through which the gas passes.

According to further aspect of the present invention, there is provided an air pollutants-contaminated gas-cleaning system which is operated by applying electric voltage supplied from a solar battery.

The most characteristic feature of the present invention is that a gas introduced into the housing is subjected to the action of a rotating fan to cause turbulence which serves to effectively contact the gas with a catalyst provided in the housing to thereby clean the gas, and/or is subjected to the action of plasma generated by glow discharge caused by the rotation of the fan. It can be understood that the equipment of such constitution can provide markedly excellent gas-cleaning effect.

In another embodiment of the present invention, a gas flow-changing member having increasing outer diameter in the intake gas-traveling direction is provided on the intake vent side with respect to the rotation blade of the fan. Therefore, the gas introduced into the gas-cleaning equipment through the intake vent collides against the surface of the gas flow-changing member to form a gas flow directed to the inside surface of the housing and, in the case of, for example, a metal layer having a catalytic activity is formed on the inside wall of the housing, the gas can be brought into effective contact with the metal layer to exert more improved gas cleaning.

In further embodiment of the present invention, the gas flow-changing member is of a conical shape, and the gas introduced through the intake vent can be effectively cleaned in a manner similar to that described above.

In further embodiment of the present invention, a plurality of rotating blades are provided on one and the same rotating shaft and rotate as one together with the shaft. In this embodiment, the gas introduced into the housing is made turbulent by one rotating blade, and the degree of turbulence is enhanced by another blade rotating together with the shaft for the gas to diffuse into a wider region, which serves to more effectively contact the gas with the catalyst and obtain markedly excellent gas-cleaning effect.

In further embodiment of the present invention, a plurality of rotating blades are provided on one and the same rotating shaft and each independently rotate from the shaft with relative rotation. In this embodiment, the gas introduced into the housing is made turbulent by one blade relatively rotating with respect to the rotating shaft, and the degree of turbulence is enhanced by another blade independently rotating from the other blade and also relatively rotating with respect to the shaft for the gas to diffuse into a wider region, which serves to more effectively contact the gas with the catalyst and obtain markedly excellent gas-cleaning effect.

In further embodiment of the present invention, the metal layer having a catalytic activity and being formed on at least one side of the inside wall of the housing is constituted by palladium. Hydrogen is selectively occluded, whereby $C_mH_n$ in the gas is decomposed into carbon and hydrogen. Thus, this embodiment shows a markedly excellent effect of removing $C_mH_n$.

In further embodiment of the present invention, a magnet layer is provided on the outer surface of said housing, an electrode (a) on the inside surface of said housing, and an electrode (b) on at least the tip of the blade facing the inside wall, and high frequency is applicable across said two electrodes to generate plasma with high density. In this embodiment, the plasma functions to effectively decompose pollutant gases such as $NO_x$.

In further embodiment of the present invention, the gas introduced through the intake vent is brought into contact with a deoxidizing element before coming into contact with the fan to decrease the content of oxygen as low as possible, thereby effective cleaning of the gas being conducted.

In further embodiment of the present invention, a copper-made, deoxidizing element is provided on the upstream side of the air pollutant-removing unit in the passageway of the gas. In this embodiment, the exhaust gas is not directly fed to the air pollutant-removing unit, but is fed to the deoxidizing element. Oxygen contained in the gas comes into contact with the deoxidizing element and undergoes the reaction of Cu+O→CuO, thus being removed from the gas. The oxygen-free exhaust gas is then fed to the air pollutant-removing unit, where the pollutant-containing gas is cleaned. In the present invention, the pollutant-containing gas is cleaned in an oxygen-free state in the air pollutant-removing unit, and hence reactions to produce NO and CO are depressed, thus air pollutants such as $NO_x$ and $CO_x$ being effectively removed.

In further embodiment of the present invention, the deoxidizing element is made of powdery copper. In this embodiment, an exhaust gas is brought into contact with powdery copper having a large surface area before being fed to the air pollutant-removing unit, thus oxygen being more effectively removed.

In further embodiment of the present invention, the deoxidizing mechanism has a honeycomb structure composed of an assembly of a plurality of cells having a copper-plated inside wall. In this embodiment, the exhaust gas is brought into a wide area of copper before being fed to the air pollutant-removing moiety to thereby more effectively remove oxygen from the exhaust gas. In addition, since the deoxidizing mechanism has a honeycomb structure, the gas flows therethrough extremely smoothly.

In further embodiment of the present invention, a first and a second deoxidizing unit and a changing means are provided and, when a first state is selected by the changing means, the exhaust gas passes through the first deoxidizing unit wherein the exhaust gas comes into contact with the deoxidizing element to undergo the reaction of CuO+O→CuO, thereby oxygen being removed, and the oxygen-free exhaust gas is then fed to the air pollutant-removing unit.

When the deoxidizing element of the first deoxidizing unit loses sufficient deoxidizing ability, the changing means is operated to change the state to a second state. In this second state, the exhaust gas passes through the second deoxidizing unit wherein it comes into contact with the deoxidizing element to remove oxygen in the same manner as described above with respect to the first state, and the oxygen-free exhaust gas is then fed to the air pollutant-removing unit to effectively clean the exhaust gas. In this second state, the first deoxidizing unit is reduced by pressure-reducing means enough to reduce the copper oxide therein.

Thus, copper oxide is reduced to copper, and the first deoxidizing unit can again deoxidize the exhaust gas. When the deoxidizing element of the second deoxidizing unit loses its sufficient deoxidizing ability, the changing means is operated to change the state to the first state. In this state, the exhaust gas again passes through the deoxidizing unit wherein it comes into contact with the regenerated deoxidizing element to remove oxygen in the same manner as described above, and the oxygen-free exhaust gas is then fed to the air pollutant-removing unit. In this first state, the second deoxidizing unit is reduced by pressure-reducing means enough to reduce the copper oxide therein. Thus, copper oxide is reduced to copper, and the deoxidizing element again acquires the sufficient deoxidizing ability. As is described above, in this embodiment, the deoxidizing element having decreased deoxidizing ability can be regenerated to again acquire sufficient deoxidizing ability by reducing it under reduced pressure during the period wherein deoxidizing treatment of the exhaust gas is conducted utilizing another deoxidizing element. Thus, maintenance of changing the deoxidizing element for new one.

In further embodiment of the present invention, one deoxidizing element having decreased deoxidizing ability can be regenerated to again acquire sufficient deoxidizing ability by heating it during the period wherein deoxidizing treatment of the exhaust gas is conducted utilizing another deoxidizing element.

In further embodiment of the present invention, heating means are provided, in addition to the pressure-reducing means, for heating the second deoxidizing unit in the first state and the first deoxidizing unit in the second state. Therefore, in this embodiment, one deoxidizing element having decreased deoxidizing ability can be regenerated more effectively to again acquire sufficient deoxidizing ability by both heating and reducing it, thereby the reduction reaction being accelerated, during the period wherein deoxidizing treatment of the exhaust gas is conducted utilizing another deoxidizing element.

In further embodiment of the present invention, while deoxidizing treatment is conducted by one of the deoxidizing element in the first deoxidizing unit and that in the second deoxidizing unit, hydrogen is fed to the other deoxidizing element by a hydrogen-supplying means to reduce copper oxide to copper ($CuO+H_2 \rightarrow Cu+H_2O$).

In further embodiment of the present invention, the gas-cleaning equipment is applied to a gas exhaust system of an automobile. In this embodiment, the aforesaid deoxidizing mechanism having been used for the deoxidizing treatment is heated by the exhaust gas of the automobile to reduce the deoxidizing element for its regeneration.

In further embodiment of the present invention, a cathode and an anode facing each other are provided in the passageway of the air pollutant-containing gas on the upstream side of the air pollutant-removing unit, and a deoxidizing element formed of zinc or indium is provided between the anode and the cathode and on the cathode side. In this embodiment, the exhaust gas is not directly introduced to the air pollutant-removing unit but is first introduced to the deoxidizing element. Oxygen contained in the exhaust gas comes into contact with zinc or indium or with a site from which oxygen has been removed by sputtering of zinc oxide (or indium oxide) to undergo the reaction of Zn+O→ZnO (or In+O→InO), thus the oxygen being selectively occluded and removed from the exhaust gas. The oxygen-free exhaust gas is then fed to the air pollutant-removing unit, where the gas is cleaned. When an electric voltage is applied across the anode and the cathode, a discharge phenomenon takes place between the two electrodes, and cations generated by the discharge are accelerated to the cathode side and cause sputtering phenomenon of converting ZnO or InO to Zn or In. Thus, this sputtering phenomenon regenerates the deoxidizing element having occluded oxygen atoms.

In further embodiment of the present invention, the gas-cleaning equipment is applied to an exhaust system of an industrial engine. In this embodiment, an exhaust gas from the industrial engine is cleaned in the gas-cleaning equipment. Additionally, the term "industrial engines" as used herein means engines provided in automobiles, ships, tractors, etc.

In further embodiment of the present invention, the gas-cleaning equipment is applied to at least part of outdoor buildings or props to constitute an air pollutant-removing system.

This air pollutant-removing system can effectively decompose pollutants-contaminated gases exhausted from automobiles or chimneys by the action of plasma and the contact with the aforesaid metal layer.

The gas-cleaning equipment may be applied to part of outdoor buildings or props, for example, part of lighting fixture provided along streets, props provided above a crossroads, or a passageway inside a chimney, and function to remove exhausted $CO_x$, $NO_x$, $SO_x$ or like pollutant gases therearound.

MECHANISM OF DECOMPOSITION OF POLLUTANT GASES

A first gas-cleaning means employed in the present invention is plasma.

As the plasma-generating mechanism, arc, corona or glow discharge, or the like is utilized. Plasma is generated inside a gas-cleaning equipment by applying an electric voltage, and pollutant gases brought into contact with the plasma are decomposed.

In the present invention, plasma may be generated by applying high frequency between electrodes provided inside the gas-cleaning equipment. Since the air pollutant-removing system is provided outdoors, the electric voltage is applied preferably by utilizing solar energy, i.e., solar battery intervened by a power inverter.

The air pollutant-removing system of the present invention is essentially intended for outdoor setting, and hence an equipment wherein the rotation number of fan is previously programmed by a control mechanism and which has a solar battery as a power source is the most reasonable.

These two gas-decomposing means are combined to conduct effective decomposition of pollutant gases.

Therefore, air pollution can be effectively prevented by applying the air pollutant-removing system to at least part of buildings or props built in outdoor places where the traffic is heavy or passageways of gases such as chimneys exhausting a large amount of pollutant gases.

In actual application of the air pollutant-removing system to outdoor buildings or the like, a plurality of the gas-cleaning equipment of the invention may be used in any arrangement if pollutant gases are contained in such high concentration that a single equipment fails to sufficiently clean the pollutant-contaminated gas. However, the gas-cleaning equipment of the present invention can clean a pollutant-contaminated gas with such a high efficiency that it is not necessary to prepare so wide space inside the air pollutant-removing system. Therefore, even when a plurality of the gas-cleaning equipment is provided, the whole system does not become so large-sized, needless to say about the case of providing a single gas-cleaning equipment.

Figure 16:
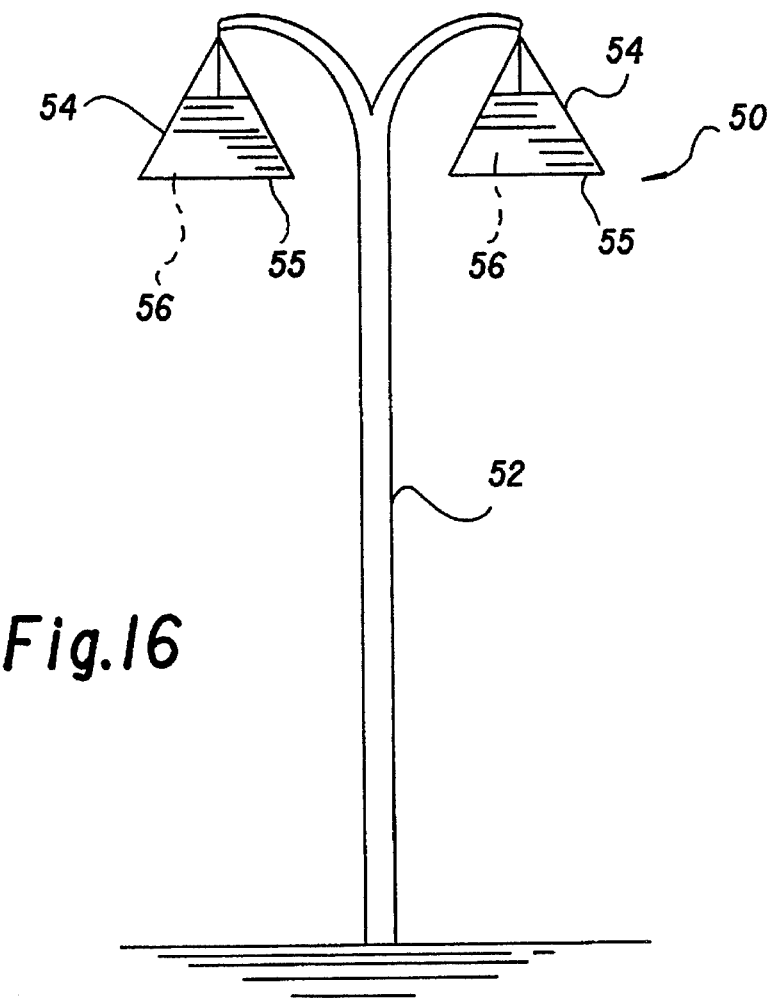
FIG. 16 is a front view showing the gas-cleaning equipment of the present invention applied to lighting fixtures lining a street.

Objects to which the air pollutant-removing system is applied are not particularly limited as long as they are built outdoors. As one preferred embodiment, there is illustrated gas-cleaning equipment incorporated in a lighting fixture provided along a street as is shown in FIG. 16, or the air pollutant-removing system incorporated in arch-shaped props above a crossroads.

In recent years, legal regulations imposed on exhaust gases from automobiles have increased, as is well known, but discharge of pollutant gases into the air is still at a serious level. In fact, diesel engine-droven automobiles are traveling while exhausting a large amount of $NO_x$ or the like.

It is known that automobiles exhaust much more exhaust gases when being started at a crossroads or the like in comparison with during continuous traveling. Therefore, it can be understood that application of the air pollutant-removing system to a prop provided above a crossroads on which automobiles travel is effective for cleaning pollutant-contaminated gases.

Another embodiment of applying the gas-cleaning equipment of the present invention is application to a gas passageway of a chimney.

Chimneys usually function as a guide path for exhausting a pollutant gas containing large amounts of $NO_x$, $SO_x$, etc. It is obvious that the pollutant gas exhausted from the chimneys is one of the factors causing air pollution and, needless to say, it is required to discharge the exhaust gas in a state of poisonous components contained therein being decomposed as much as possible.

Therefore, strict legal regulations are imposed as to exhaust gases on factories which might discharge harmful components such as chemical factories.

The air pollutant-removing system of the present invention can exhibit excellent gas-cleaning effect when applied to a gas passageway of a chimney discharging a poisonous gas such as $NO_x$, $SO_x$, etc.

Constitution of the gas-cleaning equipment of the present invention is described below by reference to drawings.

Figure 2:
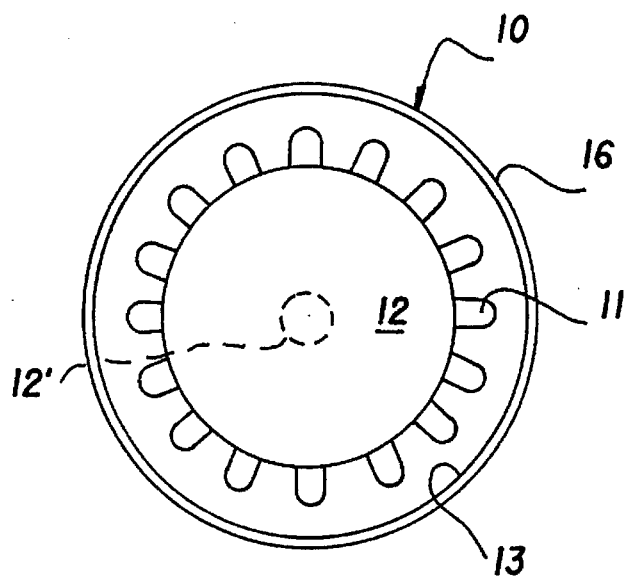
FIG. 2 is a sectional view taken on line A—A of FIG. 1.

FIG. 1 is a side sectional view showing one embodiment of the gas-cleaning equipment of the present invention, and FIG. 2 is a sectional view taken on line A—A of FIG. 1.

A first important feature of the gas-cleaning equipment of the present invention is that the equipment comprises a housing 10 having an intake vent 14 and an exhaust vent 15 and having at least one fan 12 with at least one rotating blade 11 between said two vents.

At least one fan 12 is provided inside the housing 10 and, when the size of the housing is large enough, two or more fans 12 may be provided. In the present invention, it is of importance that glow discharge is generated in a narrow gap 19 between the rotating fan 12 and inner wall 13 of the housing 10. It is preferable in view of gas-cleaning efficiency that an introduced gas passes through the inside of housing 10 in a turbulent state.

For this purpose, the most preferred housing has such structure that the rotating blade 11 rotates with a definite space from the inner wall 13 of housing 10, i.e., the inner wall 13 is in a cylindrical form. More effective gas-cleaning effect can be obtained by additionally forming unevenness on the inner wall surface or slanting the inner wall or by the combination thereof.

Figure 6:
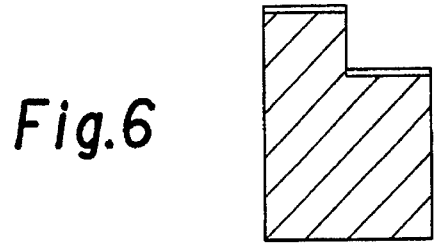
FIG. 6 shows one embodiment of the sectional shape of the rotating blade of the fan used in Example 2.

Fan 12 essentially comprises at least one rotating blade 11 provided between the two vents, and the rotating blade 11 may have a step-shaped cross section in the rotating direction (FIG. 6), a right-left unsymmetrical plane form, or a shape partly different in length. Two or more of these blades 11 may be used in combination for obtaining better gas-cleaning efficiency.

Figure 15:
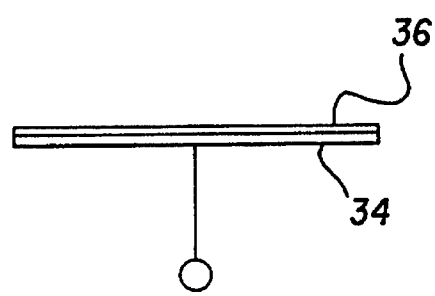
FIG. 15 is a sectional view showing a further embodiment of the fan of the present invention.
Figure 15:
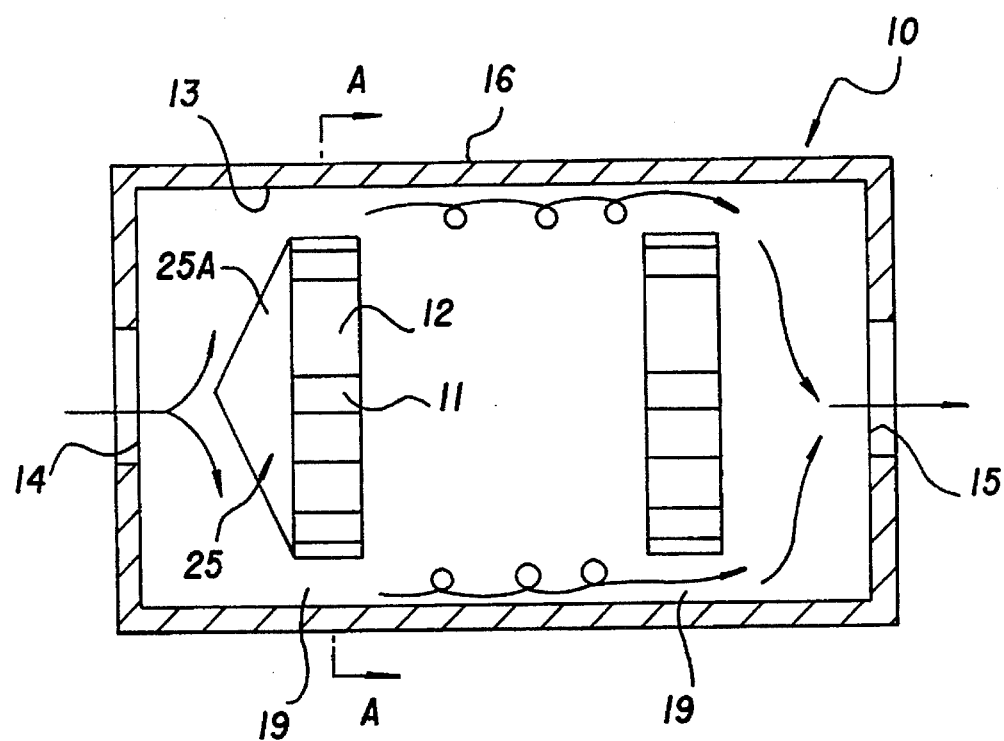

As another embodiment of fan 12, there is illustrated that in which a gas flow-changing member 25 is fixedly provided on fan 12 (see FIG. 15). That is, as is shown in FIG. 15, a conical gas flow-changing member 25 is provided on the intake vent side with respect to the rotating blade 11 of fan 12 in this embodiment. This gas flow-changing member 25 is placed in such manner that it has increasing outer diameter in the direction of from the intake vent 14 to the exhaust vent 15.

In this embodiment, the gas introduced into the housing 10 collided with the outer surface 25A of the gas flow-changing member 25, then guided to the inner wall 13 of the housing 10 by the outer surface 25A. Therefore, the gas can surely be fed to the small gap between the fan 12 and the inner wall 13, thereby cleaning of the gas by glow discharge being conducted with extreme efficiency.

Although the gas flow-changing member 25 is of a conical shape, it may be of other shape as long as the outer diameter continuously increases from the side of intake vent 14 to the side of exhaust vent 15. For example, it may be of a trigonal pyramid shape, a pyramid shape or a conical frustum shape.

As another embodiment of the fan 12, two rotating blades may be fixedly provided on a rotating shaft 12'. Additionally, the rotating shaft may be connected to a power source and, when the shaft is rotated by the power source, the two rotating blades are also rotated together with the shaft.

In this embodiment, the gas introduced into the housing 10 is made turbulent by one of the blades being rotated together with the shaft. The thus turbulent gas is made more turbulent by the other blade to diffuse more widely, which serves to increase the contact area with a catalyst, leading to a higher decomposition efficiency. Three or more rotating blades may also be used for forming preferable turbulence of the gas, though the above description is made by referring to the case of using two rotating blades.

As a further embodiment of the fan 12, two rotating blades are rotatably supported on the rotating shaft, with each blade being independently rotated. The blades may be connected to a power source, but may be independently rotated by the pressure of the gas without the power source.

In this embodiment, the gas introduced into the housing 10 is made turbulent by one of the blades being relatively rotated with respect to the shaft. The thus turbulent gas is made more turbulent by the other blade to diffuse more widely, which is preferable in view of the efficiency of cleaning the gas. Three or more rotating blades may also be used for forming preferable turbulence of the gas, though the above description is made by referring to the case of using two rotating blades.

Figure 3:
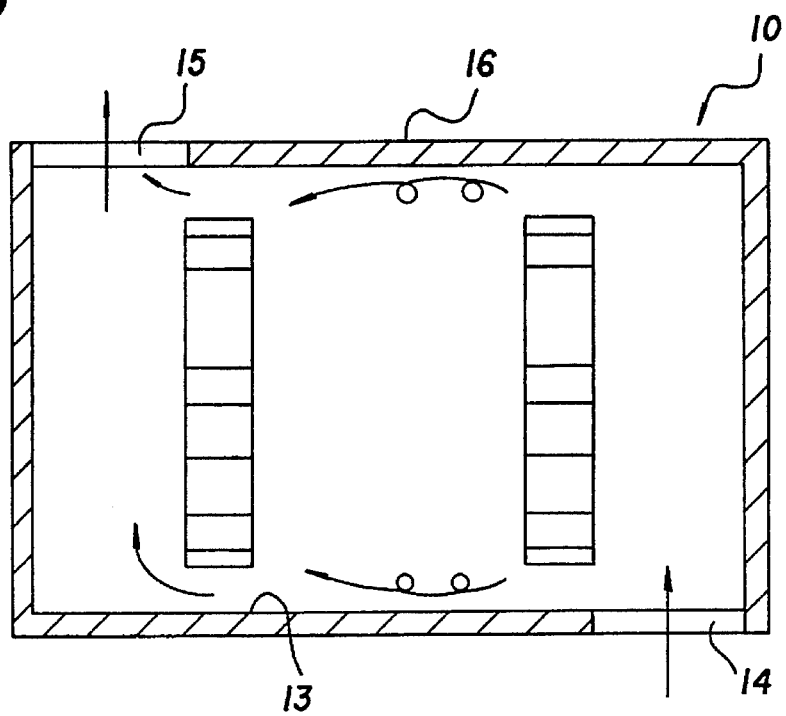
FIG. 3 is a sectional view showing another embodiment of the gas-cleaning equipment of the present invention.

The intake vent 14 and exhaust vent 15 are preferably provided on the opposite sides with respect to the housing 10, and are not required to be formed in the center of each side wall of the housing as is shown in FIG. 1, but may be of any shape of a duckboard or a latticework formed in the wall on a gas-introducing side or on a gas-exhausting side. As to the position of the vents, they may be provided at an upper or lower portion of the housing as shown in FIG. 3 as well as on the lateral wall side as shown in FIG. 1. In this situation, the intake vent and the exhaust vent are preferably provided so that the gas passes from one end of the housing 10 to the other end.

A second feature of the present invention is that a metal layer having catalytic activity is formed on at least one of the rotating blade 11 of said fan 12 and inner wall 13 of the housing 10.

The metals having catalytic activity are conventionally known and include, for example, those which are classified as transition metals such as iridium, chromium, cobalt, zirconium, cesium, tungsten, tantalum, titanium, iron, tellurium, niobium, nickel, platinum, vanadium, hafnium, palladium, manganese, molybdenum, ruthenium, rhenium, rhodium, etc.

Of these, noble metals such as platinum, palladium, ruthenium and rhodium are most preferably used.

In order to form the metal layer, known electroplating or chemical plating technique is preferably employed. In addition, any other techniques such as a technique of fixedly providing a metal foil with the aid of an adhesive may also be employed. In forming the metal layer by the plating technique, plating conditions are usually from room temperature to 50° C. and 20 minutes to 2 hours in plating time, though depending upon the kind of metal. The metal layer is not particularly limited as to its thickness, but is preferably formed in a thickness of about 3 to about 10 μm.

The above-illustrated metals having catalytic activity are effective for cleaning a gas contaminated with air pollutant such as $NO_x$. Palladium was found to be extremely effective for removing $C_mH_n$ ($CH_4$, $C_2H_4$, etc.).

The housing 10 may be constituted by a metal, glass, ceramic, or a functional high polymer material which permits formation of a metal layer thereon by plating or like technique such as polyphenylene ether. The fan 12 to be used in the present invention is required to permit formation of a metal layer on the blade and generate glow discharge from the blade 11 upon rotation. In order to meet these requirements, the fan is preferably constituted by metal.

Figure 7:
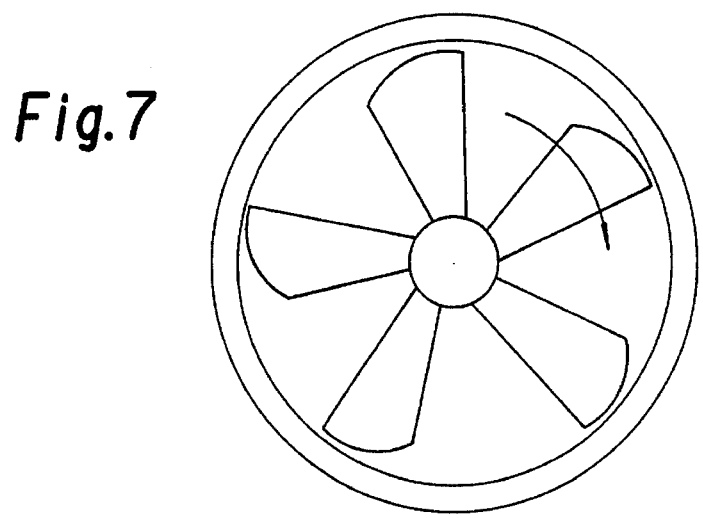
FIG. 7 shows one embodiment of the plane shape of the rotating blade of the fan used in Example 2.

The metal layers may be variously combined to attain more effective cleaning of the gas, as the blades of fan 12 may be variously combined with respect to number and shape of blades. That is, the number and shape of rotating blades of fan 12 are preferably constituted so that more glow discharge may be generated by rotation of the blades, and the blades are preferably of such shape that the gap expands in the rotating direction as shown in FIG. 7.

As to the metal layers formed on the rotating blade 11 and the inner wall of housing, a plurality of different metal layers may be fixedly provided to attain better gas-cleaning efficiency instead of a single metal layer.

As one embodiment thereof, a plurality of metals such as platinum and palladium are combined in any pattern to form a platinum-palladium layer on the surface of the rotating blade 11, with both platinum and palladium being laid bare. An embodiment wherein different metal layers are formed respectively on at least two blades, e.g., a platinum layer is formed on the surface of one blade, and a palladium layer on the surface of the other blade, is also effective for attaining a high gas-cleaning efficiency. Further, there is illustrated an embodiment wherein a plurality of metal layers are formed on at least one blade, e.g., a platinum layer is formed as a first layer, and a palladium layer is formed thereon. In this embodiment, even when the outermost layer is worn out by abrasion or the like, the second layer can exert the gas-cleaning performance.

As to formation of the metal layer, the same as is described with respect to blade 11 naturally applies to formation of the metal layer on the inner wall of the housing. That is, with the metal layer on the inner wall, it is similarly effective to form a metal layer wherein a plurality of metals are combined and laid bare, or form a plurality of metal layers.

It can be easily understood that, in these embodiments, changing the kind of metal or optionally combining the embodiments are also within the scope of the present invention.

When the fan 12 in the gas-cleaning equipment of the present invention is constituted so that it may be started or stopped by ON/OFF operation of a power source, its rotational speed can be controlled as demanded. However, the fan 12 may be started by the pressure of the gas blown into the equipment without the power source, and glow discharge is caused, by rotation of the blade 11. The glow discharge generates plasma which functions to clean the gas. In this situation, the gas inside the housing 10 flows in a turbulent state, cleaning of the gas by the action of plasma is effected with more efficiency.

Merits of making the gas in the housing 10 turbulent can be also understood by considering effective contact between the gas and the metal layer having catalytic activity and formed on the blade 11 in the housing 10. When these actions are combined, markedly synergistic, gas-cleaning effect can be obtained.

In the present invention, it is of importance to increase the area of contact between the gas and the metal layer for the purpose of enhancing the gas-cleaning efficiency. For this purpose, it is preferred to increase the area of the metal layer and the rotating power of said fan 12. In view of cost and size limitations, practically preferred amount of the gas brought into contact with the metal layer is about 30 cc/min. When starting of the fan 12 is conducted by switching on a power source, the ON/OFF operation is conducted by a known switch (not shown) connected to the fan 12. In this situation, the number of rotations of fan 12 can properly be controlled by a controlling mechanism connected to the switch.

Additionally, the gas-cleaning equipment of the present invention is preferably operated under reduced pressure in view of stably causing and maintaining glow discharge. Hence, the gas-cleaning equipment is recommended to be operated in a closed state.

In another preferable embodiment of the gas-cleaning equipment of the present invention, a plasma with high density is generated between the rotating fan 12 and the inner wall of the housing, thereby gas-decomposing efficiency being markedly increased.

Figure 9:
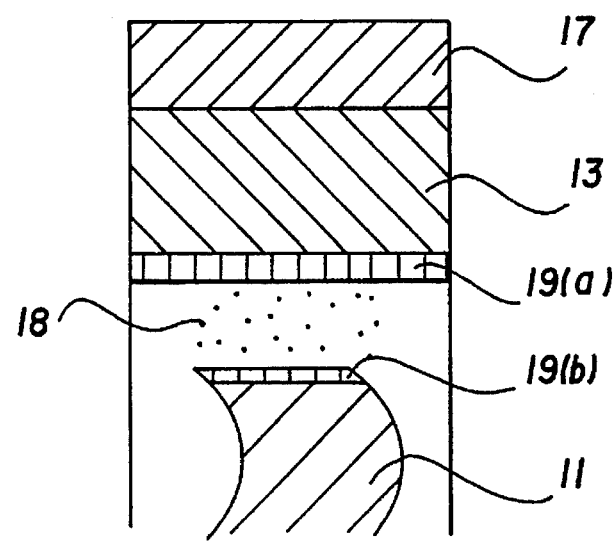
FIG. 9 is a side sectional view showing one embodiment of the gas-cleaning equipment in which a magnet is provided on the outer wall of the housing and electrodes are provided on the inner wall and the fan.

In order to generate a plasma with high density between the rotating fan 12 and the inner wall of the housing, a magnet layer 17 is provided on the outer surface of the wall of the housing 10, an electrode 19(*a*) on the inner surface of the wall, and an electrode 19(*b*) on at least the tip of blade 11 facing the inner wall, as is shown in FIG. 9 as a side sectional view. When high frequency of, for example, about ECR (40.68 MHz) is applied across the electrodes, a plasma 18 with a density as high as $10^{20}$ /m$^2$ or more in electron density is generated and functions to effectively decompose pollutant gases such as $NO_x$.

The principle of generating a plasma with high density between said electrodes can be explained by ECR (Electron Cyclotron Resonance) effect schematically shown by FIG. 9.

Figure 10:
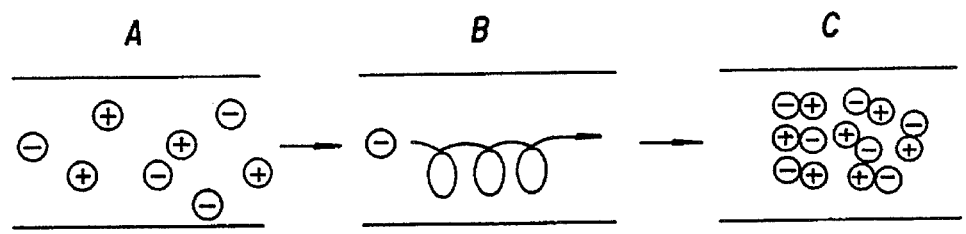
FIG. 10 shows as a model the state of generated plasma in the equipment shown in FIG. 9.

That is, when high frequency is applied across the electrodes 19(*a*) and 19(*b*), there arise changes of A-B-C as shown in FIG. 10 and, at the stage of C, a plasma with high density is generated between 19(*a*) and 19(*b*). This plasma functions to decompose $NO_x$ or the like contained in the gas.

As the electrodes, noble metals such as Pt, Rh and Pd are used, with Rh being most preferably used.

The gas-cleaning equipment of the present invention shows a markedly improved gas-cleaning efficiency when the gas introduced through the intake vent 14 is brought into contact with the deoxidizing mechanism before being brought in contact with fan 12 to decrease the content of oxygen to the order of ppm order.

If oxygen coexists in the exhaust gas, $NO_x$ cannot be effectively removed and, in addition, the reaction is known to proceed in the direction of production of NO. It has recently been reported that $NO_x$ can be selectively reduced by properly selecting a catalyst using hydrocarbons.

According to the studies of the inventors, however, it has been found that, even when oxygen exists in the exhaust gas, production of NO can be prevented as long as $H_2O$ exists in the system.

Thus, production of NO can be prevented by positively introducing a $H_2O$ component into the gas-cleaning element of the gas-cleaning equipment to control humidity % based on the information obtained from a humidity sensor provided on the exhaust vent side of the gas-cleaning equipment.

In the present invention, deoxidation can preferably be conducted by (1) bringing oxygen into contact with a heated silver member, (2) subjecting the surface of stabilized zirconia to sputtering to thereby make part of the surface deficient and selectively occlude oxygen therein, (3) bringing oxygen into contact with copper, and (4) sputtering the surface of zinc oxide or indium oxide to make part of the surface oxygen deficient and selectively occlude oxygen therein.

The method of bringing oxygen into contact with a heated silver member utilizes the property of silver that, though stable to oxygen at ordinary temperature, silver forms a solid solution with oxygen when heated to an elevated temperature.

Silver, which is a metal having a melting point of 961° C. and a boiling point of 1980° C., forms a solid solution with oxygen wherein 0.001% of oxygen exists at 600° C., and 0.006% of oxygen at 930° C.

As one embodiment of the deoxidizing mechanism, it is advantageous to provide silver wire equipped with a heating means between the intake vent 14 and the fan 12. It is preferred to contact oxygen with wire having a surface area as much as possible. Thus, the silver wire is desirably provided densely taking care of not inhibiting passage of the gas.

Figure 8:
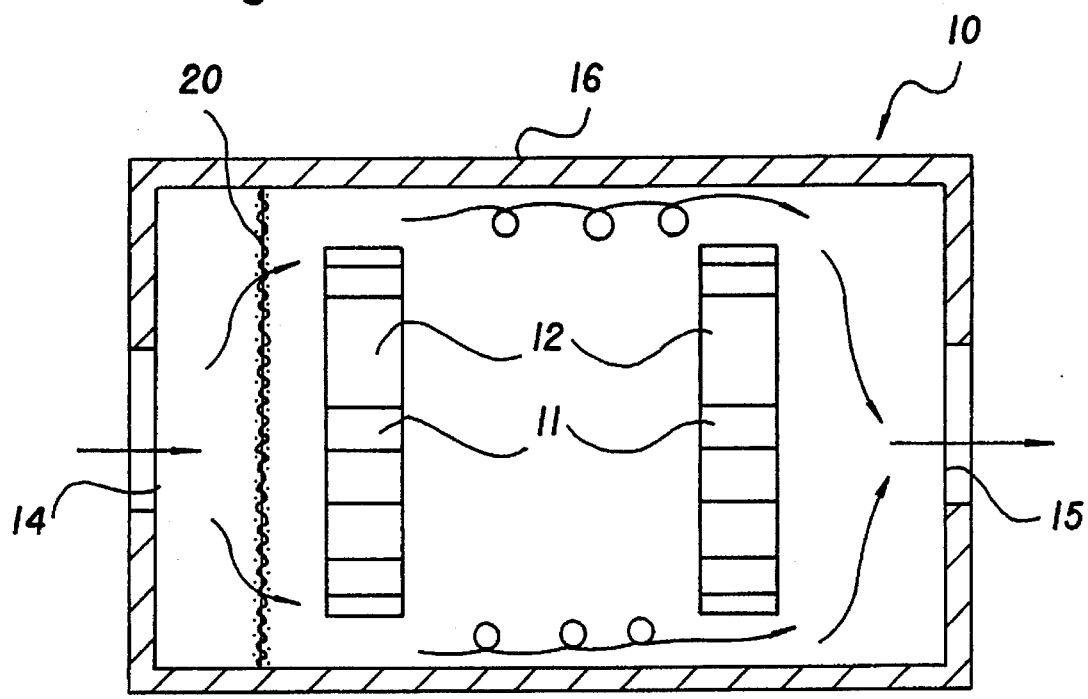
FIG. 8 is a side sectional view showing one embodiment of the gas-cleaning equipment installed with the deoxidizing mechanism in Example 3.

The most preferred embodiment thereof is shown in FIG. 8 wherein a deoxidizing mechanism 20 constituted by silver wire meshes are provided between the intake vent 14 and the fan 12. In this embodiment, the size of the meshes is usually about 10 to about 50 mesh, preferably about 15 mesh to about 30 mesh. If the mesh size exceeds 50 mesh, the silver wire meshes tend to inhibit passage of the gas, whereas if less than 10 mesh, only insufficient deoxidizing power is obtained.

In a more preferred embodiment, an energizing circuit (not shown) is connected to the silver wire meshes so as to energize by pulse current to thereby instantly heat the silver wire meshes to an elevated temperature of about 600° to about 930° C. This temperature condition can freely be controlled by changing the high value and time of the pulse wave.

Experiments made by the inventors have revealed that oxygen content can be reduced in such a degree that a figure of the content is moved more than two places to the right.

Additionally, excessively occluded oxygen may be released by sputtering during the period wherein the element is in an OFF state.

A second embodiment of the deoxidizing mechanism using silver is that wherein powdery silver is filled in a tubular members. Temperature of the silver is raised by heating the tubular member from outside, and a gas is passed through the heated tube to conduct occlusion of oxygen.

In this embodiment, it is preferred to dispose silver-filled fine tubular members S as many as possible between the intake vent and the fan to increase the surface area of silver with which oxygen is to be brought into contact.

In a more preferred embodiment, heating means such as a Peltier element or a heater is provided on the outer surface of the tubular member.

A further embodiment of the deoxidizing mechanism is that in which the surface of stabilized zirconia is sputtered to make part of the surface oxygen-deficient for selectively occluding oxygen therein.

A technical feature of this embodiment lies in that stabilized zirconia (YSZ) and copper are used as an outer electrode and an inner electrode, respectively, and, when high frequency current is conducted from an energizing circuit, there is caused a sputtering phenomenon whereby part of the YSZ surface is made oxygen-deficient and active, the active part selectively occluding oxygen.

The energizing circuit is repeatedly switched on and off and, in this embodiment, too, excessively occluded oxygen atoms are desirably released by sputtering during the period wherein the deoxidizing element is in an OFF state.

Figure 11:
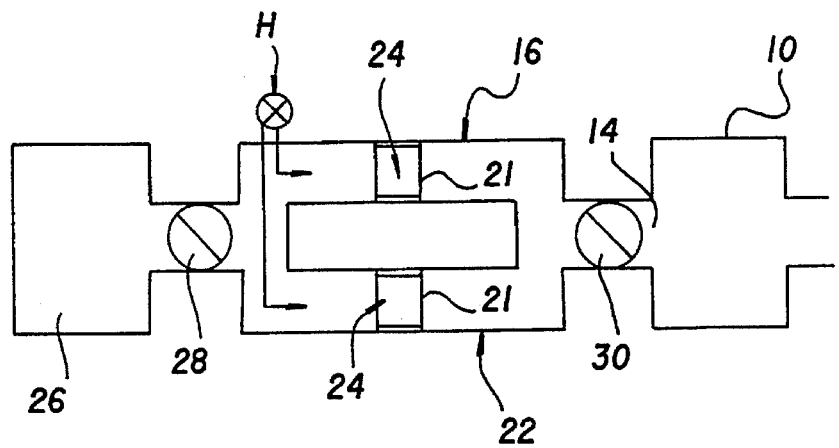
FIG. 11 shows one embodiment of the deoxidizing mechanism of the present invention.

FIG. 11 shows a further embodiment of the deoxidizing mechanism wherein a first deoxidizing unit 16 and a second deoxidizing unit 22 are provided after the intake vent 14 (see FIG. 1) of housing 10. The first deoxidizing unit 16 and the second deoxidizing unit 22 are in a cylindrical form made of ceramic, deoxidizing element 24 being retained in each of the units.

Figure 12:
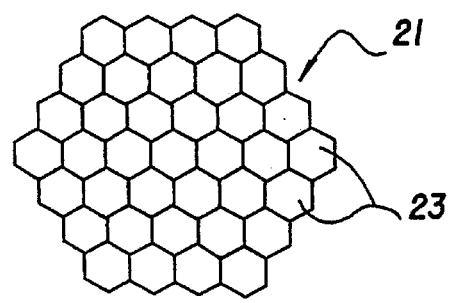
FIG. 12 shows the deoxidizing element shown in FIG. 11 viewed from the left or right side.
Figure 13:
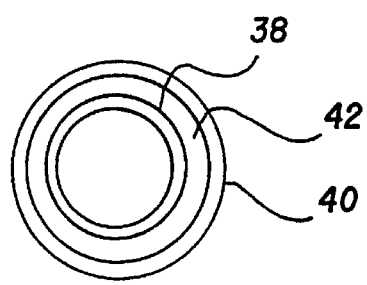
FIG. 13 shows the deoxidizing unit provided with the deoxidizing mechanism shown in FIG. 11 viewed from the axial direction.

This deoxidizing element 24 is constituted by a ceramic cylindrical member 21 plated by copper. This copper-plated member 21 may be of a honeycomb structure wherein a plurality of cells 23 having a polygonal cross section (a hexagonal example being shown in FIG. 12) are bundled. The cells 23 extend in the direction crossing at right angles with the paper and their axes directions coincide with the axial directions of the first and the second deoxidizing units 16 and 22.

All over the inner surface of each cell 23 is copper-plated, which ensures sufficient contact between the copper and the gas to attain enough deoxidizing ability.

Additionally, in FIG. 11, the deoxidizing units 24 are shown in a state of being separated from the inner surface of each of the first and the second deoxidizing units for the purpose of making definite the boundary of each constituent but, in fact, they are in contact with each other, thus the gas invariably passes through each cell 23.

As to the size of the cell 23, it may preferably be about 3 to about 5 cm in length in the axial direction and about 3 to about 5 cm in inside diameter, though depending upon concentrations of pollutant gases to be treated.

As is shown in FIG. 11, a first valve 28 is provided as a changing means between the inlet 26 for the exhaust gas and both the first and the second deoxidizing units 16 and 22. This first valve 28 functions to selectively pass the exhaust gas from the inlet 26 through one of the first and the second deoxidizing units 16 and 22.

The first and the second deoxidizing units 16 and 22 are connected with a vacuum pump (not shown), and the inside of each of the first and the second deoxidizing units 16 and 22 can be reduced to $10^{-2}$ to $10^{-4}$ atm.

A metal member such as a tungsten member may be sintered on the outer surface of each of the first and the second deoxidizing units 16 and 22. When an electric voltage is applied to the tungsten member to generate Joule's heat, the inside of each of the first and the second deoxidizing units 16 and 22 may be heated to a temperature of 400° to 1100° C. Additionally, this tungsten heater is provided all over or part of the outer surface of each of the first and the second deoxidizing units 16 and 22.

A second valve 30 is provided as another changing means between both the first and the second deoxidizing units and the housing 10. This changing means functions, in one state, to connect the first deoxidizing unit to the intake vent 14 and break the connection of the second deoxidizing unit 22 to the intake vent 14 and, in other state, connect the second deoxidizing unit 22 to the intake vent 14 and break the connection of the first deoxidizing unit 22 to the intake vent 14.

In conducting gas cleaning, the first valve 28 and the second valve 30 are operated so that the first deoxidizing unit 16 is connected to the inlet 26 and the intake vent 14 of housing 10 (first state). (In this state, connection of the second deoxidizing unit 22 to the inlet 26 and the intake vent 14 is broken.) In this state, a gas to be cleaned enters into the first deoxidizing unit 16 and passes through cells 23 of the deoxidizing element 24 inside the unit. During the passage, the gas comes into contact with a copper plate to undergo the reaction of Cu+O→CuO, and fed into the housing 10 in an oxygen-free state, thus air pollutants being effectively decomposed.

When oxygen-removing ability of the deoxidizing element 24 in the first deoxidizing unit 16 becomes insufficient, the first valve 28 and the second valve 30 are operated so that the second deoxidizing unit 22 is connected to the inlet 26 and the intake vent 14 of housing 10 (second state). (In this state, connection of the first deoxidizing unit 16 to the inlet 26 and the intake vent 14 is broken.) In this state, a gas to be cleaned enters into the second deoxidizing unit 22 and passes through cells 23 of the deoxidizing element 24 inside the unit. During the passage, the gas comes into contact with a copper plate and fed into the housing 10 in an oxygen-free state, thus air pollutants being effectively decomposed.

In this second state, the first deoxidizing unit 16 is reduced to the level at which copper oxide is reduced to copper by means of a vacuum pump. Thus, copper oxide is reduced to copper, and the deoxidizing unit regains the initial deoxidizing ability. When oxygen-removing ability of the deoxidizing element 24 in the second deoxidizing unit 22 becomes insufficient, the first valve 28 and the second valve 30 are operated to realize the first state. In this state, a gas to be cleaned passes through the first deoxidizing unit 16. During the passage, the gas comes into contact with the deoxidizing element 24 and fed into the housing 10 in an oxygen-free state as is the same as described above. In this first state, the second deoxidizing unit 22 is reduced to the level at which copper oxide is reduced to copper by means of a vacuum pump. Thus, copper oxide is reduced to copper, and the deoxidizing unit regains the initial deoxidizing ability.

Additionally, though copper in the deoxidizing element 24 is provided in a plated state in the above description, it may be in a powdery form and filled in the first and the second deoxidizing units 16 and 22. In such embodiment, the copper powder preferably has a particle size of 0.5 mm or more. If the particle size is less than 0.5 mm, it becomes difficult for a gas to flow. Additionally, state of the copper used in the deoxidizing element 24 is not limited to the above-described plated or powdery form, but may be supported by the first and the second deoxidizing units 16 and 22 or may be in a sputtered or vacuum-deposited state.

Additionally, although reduction of copper oxide to copper in the deoxidizing element 24 by heating utilizing a metal such as tungsten and reducing pressure using a vacuum pump, it is also possible to reduce copper oxide by merely heating.

One example thereof is the constitution wherein the gas-cleaning equipment is provided in an automobile exhaust system and copper oxide is reduced by the exhaust gas.

In this embodiment, the first deoxidizing unit 16 and the second deoxidizing unit 22 are respectively constituted by a ceramic inner cylinder 38 and an outer cylinder 40 retaining said inner cylinder 38. An exhaust gas from an automobile is introduced into a space 42 formed between the inner cylinder 38 and the outer cylinder 40, and the deoxidizing element 24 is heated by the heat of the exhaust gas. The oxidized deoxidizing element 24 is reduced to copper ($CuO \rightarrow Cu+O$) by the heat to again acquire sufficient deoxidizing ability.

With respect to a deoxidizing element 24 containing zinc oxide which can be reduced at about 1050° C. or above under atmospheric pressure, it can be reduced by the exhaust gas having a temperature of 300° to 1500° C., thus no additional special heating means being required.

In addition, copper oxide in the deoxidizing element 24 may be reduced only by reducing pressure using a vacuum pump. In this case, pressure reduction in the deoxidizing element 24 may be conducted to a level of $10^{12}$ atm or less than that at ordinary temperature.

As a further method for reducing the deoxidizing element 24, hydrogen may be fed into the first deoxidizing unit 16 (or the second deoxidizing unit 22). In this case, a bomb H filled with hydrogen-occluding palladium functioning as a hydrogen-occluding metal is connected to the first deoxidizing unit 16 and to the second deoxidizing unit 22 via a changing valve. In this embodiment, when the deoxidizing element 24 in the first deoxidizing unit 16 loses its deoxidizing ability as a result of oxidation of the element in the aforesaid first state, the foregoing valve is operated to realize the second state as is described above, and a hydrogen gas is introduced into the first deoxidizing unit 16 by operating the changing valve. Thus, copper oxide is reduced ($CuO+H_2 \rightarrow Cu+H_2O$), and the deoxidizing element 24 again acquires sufficient deoxidizing ability.

When the deoxidizing element 24 in the second deoxidizing unit 22 loses its deoxidizing ability in this second state, the system is again made in the first state, and a hydrogen gas is fed into the second deoxidizing unit 22 by operating the valve to thereby reduce the deoxidizing element 24 in the second deoxidizing unit. Thus, the deoxidizing element 24 again can exhibit full deoxidizing ability.

Figure 14:
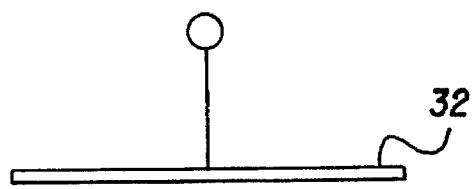
FIG. 14 shows one embodiment of the deoxidizing mechanism of the present invention.

FIG. 14 shows a further embodiment of the deoxidizing mechanism. An anode 32 and a cathode 34 are provided face-to-face with each other at a position before the housing 10 shown in FIG. 1 (i.e., upstream side with respect to the housing 10). A deoxidizing thin layer 36 composed of zinc oxide is formed on the surface of the cathode 34 facing the anode 32. A direct current voltage-applying means (not shown) is connected to both the anode 32 and the cathode 34.

When a direct current voltage is applied across the anode 32 and the cathode 34, glow discharge is generated between the anode 32 and the cathode 34, and the cation generated by the glow discharge is accelerated to the side of the cathode 34. Part of the deoxidizing thin layer is made into an active, oxygen-deficient state by the sputtering utilizing the accelerated cation, and oxygen is selectively occluded in the active part to remove oxygen from the gas to be cleaned. The oxygen-occluding part regains its deoxidizing activity by conducting again the sputtering.

Additionally, the form of zinc oxide in the deoxidizing mechanism is not limited to the above-described thin layer, but may be in a bulk metal form. As the deoxidizing material, zinc, indium or indium oxide may also be used in place of zinc oxide.

A specific example of applying the air pollutant-removing system containing the gas-cleaning equipment of the present invention to a building built outdoors is described below by reference to drawings.

Figure 17:
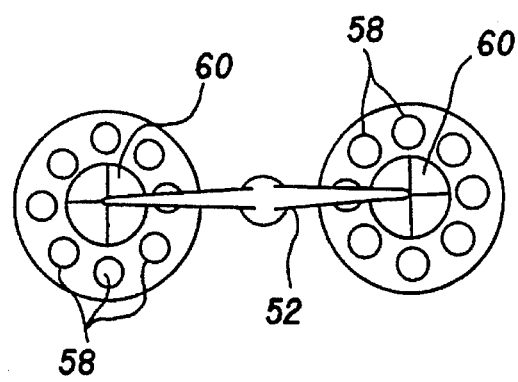
FIG. 17 is a plane view of FIG. 16.

FIGS. 16 and 17 show a lighting fixture 50 to which an air pollutant-removing system containing the gas-cleaning equipment of the present invention is applied. A plurality of the lighting fixtures 50 are intended to be provided along both street sides at regular space intervals. Transparent or semi-transparent conical covers 54 for illumination lights are suspended from the top of prop 52 of the lighting fixture 50. The aforesaid gas-cleaning equipment 58 is contained in the covers 54 and constitutes in the aggregate an air pollutant-removing system 56.

As is shown in FIG. 17, the air pollutant-removing system 56 is constituted by a plurality of the gas-cleaning equipment 58. A single or plurality of the gas-cleaning equipment 58 is provided inside the cover 54 along its periphery. An illuminating light 60 is provided inside of the gas-cleaning equipment 58. In this specific example, the gas-cleaning equipment 58 has the same structure as shown in FIG. 1.

Although rhodium is used as the metal having catalytic activity on the surface of the rotating blade, any metal belonging to the platinum group may be used.

Additionally, bottom 55 (see FIG. 16) of the illumination light cover 54 is open, and each gas-cleaning equipment 58 is provided so that the intake vent 14 (see FIG. 1) faces downward in FIG. 16. Thus, pollutant-contaminated gases exhausted from automobiles or the like ascends through the intake vent 14 and passes through the exhaust vent 15 (see FIG. 1).

A solar battery (not shown) is connected to the peripheral wall 10A of the housing 10 shown in FIG. 1 and the metal layer 11A via a power inverter (not shown), by which high frequency can be applied across the inner surface of the peripheral wall 10A of housing 10 and the metal layer 11A. Glow discharge can be generated in the small gap 19 between the inner surface of the peripheral wall 11A and the metal layer 11A by applying the high frequency. This glow discharge in turn generates a plasma in the small gap 19. Additionally, known high frequency-generating means may of course be employed instead of the solar battery.

It is explained below how the specific example shown in FIGS. 16 and 17 works.

Under comparatively strong sunlight such as under fine weather, a photochemical smog (containing air pollutants) is liable to be formed. In such cases, a direct current of a solar battery is conducted via a power inverter as high frequency current between the inner surface of the peripheral wall 10A of housing 10 and the metal layer 11A to thereby cause glow discharge in the small gap 19.

A pollutant gas exhausted from traveling automobiles passes through the intake vent 14 of each gas-cleaning equipment of the air pollutant-removing system 56 provided in the lighting fixture 50 and reaches the small gap 27, and the pollutant gas such as $NO_x$ is decomposed by a plasma generated in the small gap 19. The pollutant gas is also decomposed by the catalytic action of the metal layer 11A. In this example, $NO_x$ is decomposed, thus productions of acrolein and methyl nitrate, which are main causes of photochemical smog, is inhibited.

The thus cleaned gas is exhausted through the exhaust vent 15 into the open air outside the air pollutant-removing system 56. In the above-described specific example, the air pollutant-removing system is constituted by a plurality of gas-cleaning equipment 58. However, when the pollutant-contaminated gas contains pollutants in a concentration low enough to be decomposed by a single gas-cleaning equipment, the air pollutant-removing system 56 may be constituted by a single gas-cleaning equipment 58.

Since the above-described air pollutant-removing system 56 is usually provided outdoors, equipment which contains a solar battery as a power source and in which rotation number of the fan is controlled by a previously programmed controlling mechanism is most rational. Additionally, the fan 12 may be started or stopped by switching on or off a normal power source, or may be rotated by the natural, outdoor wind pressure. When the gas-cleaning equipment 58 is provided in a chimney, the fan 12 may be rotated by the pressure of a gas ascending upward.

As is the same with the aforementioned gas-cleaning equipment, cleaning of the pollutant-contaminated gas can be more effectively conducted by further providing a deoxidizing mechanism before the fan 12, bringing the gas to be blown through the intake vent 14 into contact with the deoxidizing mechanism to decrease the oxygen level to, for example, an order of ppm, and bringing the oxygen-free gas into contact with the fan 12. Though the above description is made by reference to an example wherein the air pollutant-removing system 56 is applied to the lighting fixture 50, the example is not limitative and the system may be provided above a crossroads where the traffic is heavy or in a chimney of a factory.

The present invention is now described in more detail by reference to examples which, however, are not construed to be limitative at all. Therefore, the invention may be embodied in other specific forms without departing from the spirit or essential characteristics thereof.

EXAMPLE 1

Two fans having 10 blades with a spread tip end and being fixed at an angle of 45° with respect to the rotating direction were disposed, with an interval of 100 mm therebetween, in a metal-made, cylindrical housing having circular openings of 5 mm in inside diameter in both ends and having an inside diameter of 25 mm, a length of 200 mm and a wall thickness of 0.5 mm as shown in FIG. 1 with an interval between the inner surface of the housing and the fan being 1 mm.

Figure 4:
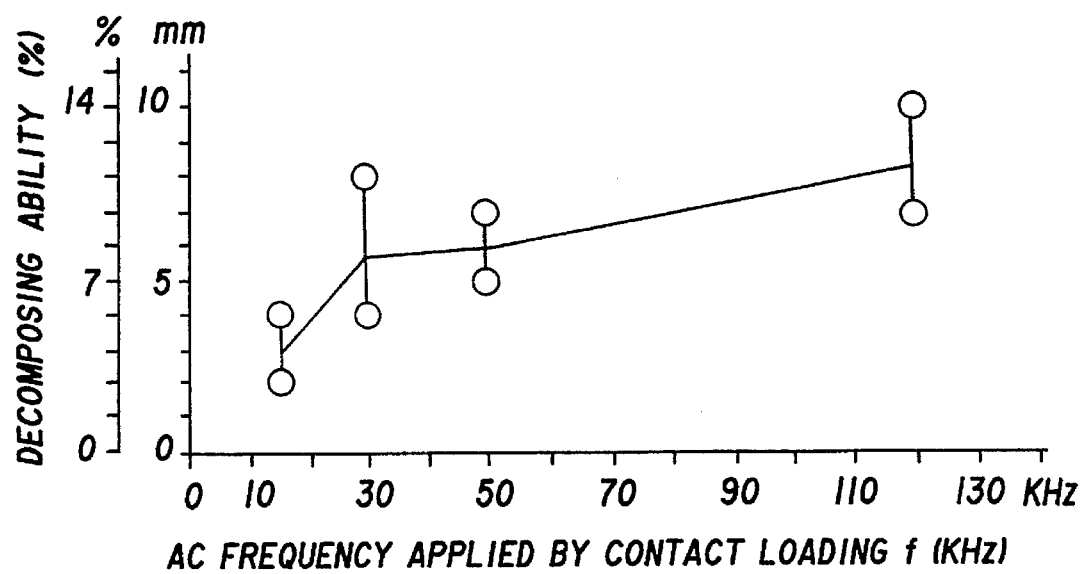
FIG. 4 is a graph showing frequency dependence of the gas-decomposing ability obtained in Example 1.
Figure 5:
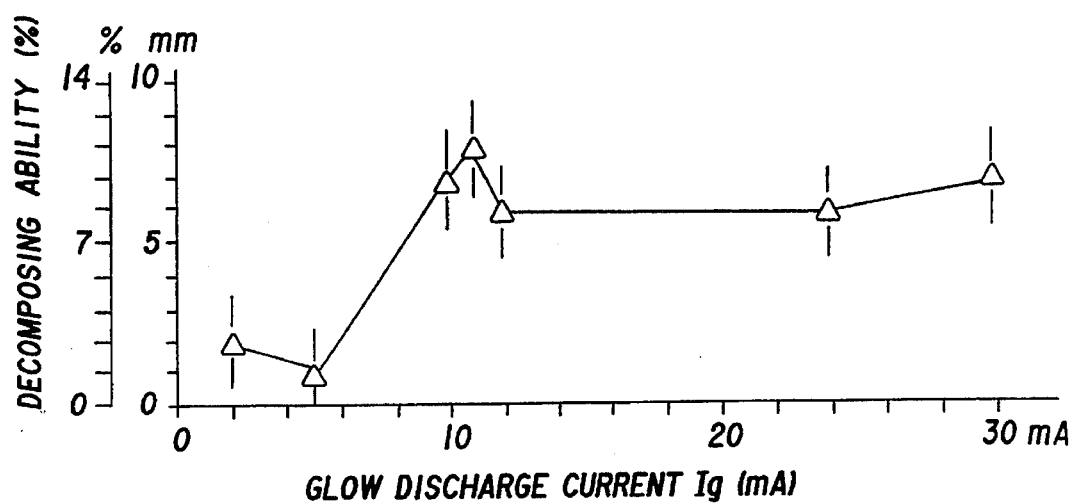
FIG. 5 is a graph showing glow discharge current dependence of the gas-decomposing ability obtained in Example 1.

A 5-µm thick platinum layer was formed on the tip end of each blade by electroplating, and a 5-µm thick palladium layer on the inner surface of the housing. A gas of $N_2$ and NO (240 ppm) was introduced through the intake vent 14 under the conditions of 30 cc/min in flow rate and 1.1 atmospheres in pressure. Decomposing ability when the number of rotation of the fan was 7,000 rpm was measured in view of frequency dependence and glow discharge current dependence. Results thus obtained are shown in FIGS. 4 and 5, respectively.

EXAMPLE 2

The same procedure was conducted as in Example 1 except that the rotating blade of the fan had a cross section of a step-like shape in the rotating direction, and that a platinum layer was formed on the upper portion and a rhodium layer on the lower portion.

As a result, NO contained in $N_2$ was found to be decomposed into N and O.

EXAMPLE 3

A 16-mesh network made of 10-µ thick silver wire was provided between the gas intake vent 14 and the fan in the gas-cleaning equipment used in Example 1 in such manner that the whole periphery of the network was in contact with the inner surface of the housing as shown in FIG. 8.

A ternary gas composed of $N_2+NO+O_2$ (containing 0.025% of $O_2$) was introduced into the housing under the conditions of 30 cc/min in flow rate and 1.1 atmospheres in gas pressure while the silver network being heated to 920° C. by conducting a pulse current through the silver wire. The rotation number of the fan was set to 7,000 rpm. In this situation, the same decomposing ability was obtained as in the case of Example 1 using an oxygen-free gas.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all the changes which come within the meaning and range of equivalency of the claims are therefore intended to be embraced therein.

What is claimed is:

1. A gas-cleaning apparatus which comprises a housing provided with an intake vent and an exhaust vent, and having at least one fan with at least one rotating blade disposed between said vents, means for generating glow discharge at a gap between said at least one rotating blade and an inner wall of the housing, wherein at least one of the inner wall of the housing and the at least one rotating blade is provided with a metal layer having a catalytic action, and said means for generating glow discharge comprises a magnet layer on an outer surface of said housing, a first electrode on an inside surface of said housing, and a second electrode on at least a tip of the blade facing the inside surface of the housing wherein a frequency is applicable across said two electrodes to generate plasma.

2. The gas-cleaning apparatus as recited in claim 1, further comprising a gas flow-changing member having a shade in which an outer diameter increases in an intake gas-traveling direction, said gas flow-changing member being provided on an intake vent side with respect to the rotating blade of the fan.

3. The gas-cleaning apparatus as recited in claim 2, wherein said gas flow-changing member is of a conical shape.

4. The gas-cleaning apparatus as recited in claim 1, wherein said at least one rotating blade comprises a plurality of rotating blades provided on one rotating shaft, wherein said plurality of rotating blades rotate as one together with the shaft.

5. The gas-cleaning apparatus as recited in claim 1, wherein said at least one rotating blade comprising a plurality of rotating blades provided on one rotating shaft and each of said rotating blades independently rotates from the shaft with relative rotation.

6. The gas-cleaning apparatus as recited in claim 1, wherein said at least one rotating blade has a step-shaped cross section in the rotating direction.

7. The gas-cleaning apparatus as recited in claim 1, wherein said at least one rotating blade has a right-left nonsymmetrical plane form.

8. The gas-cleaning apparatus as recited in claim 1, wherein said at least one rotating blade has a shape partly different in length.

9. The gas-cleaning apparatus as recited in claim 1, wherein said at least one rotating blade comprises at least two types of blades, said blades being selected from the group consisting of a blade having a step-shaped cross section in the rotating direction, a blade having a right-left nonsymmetrical plane form and a blade having a shape partly different in length.

10. The gas-cleaning apparatus as recited in claim 1, wherein said at least one rotating blade is provided with a metal layer having catalytic activity fixedly provided on a surface of the rotating blade.

11. The gas-cleaning apparatus as recited in claim 10, wherein said metal layer is fixedly provided on at least one rotating blade and contains a plurality of metals.

12. The gas-cleaning apparatus as recited in claim 10, wherein said at least one rotating blade comprises two blades having different metals respectively fixedly provided thereon.

13. The gas-cleaning apparatus as recited in claim 10, wherein said metal layer is formed by providing a plurality of metals in a plurality of layers on said at least one rotating blade.

14. The gas-cleaning apparatus as recited in claim 10, wherein said metal layer comprises at least one noble metal selected from the group consisting of platinum, palladium, ruthenium and rhodium.

15. The gas-cleaning apparatus as recited in claim 1, wherein the inner wall of said housing is of about a cylindrical shape.

16. The gas-cleaning apparatus as recited in claim 1, wherein the inner wall of said housing has an uneven surface.

17. The gas-cleaning apparatus as recited in claim 1, wherein the inner wall of said housing is slanted.

18. The gas-cleaning apparatus as recited in claim 1, wherein a metal layer having a catalytic activity is fixedly provided on the inner wall of said housing.

19. The gas-cleaning apparatus as recited in claim 18, wherein said metal layer fixedly provided on the inner wall is composed of a plurality of metals.

20. The gas-cleaning apparatus as recited in claim 18, wherein said metal layer fixedly provided on the inner wall is composed of a plurality of layers of a plurality of metals.

21. The gas-cleaning apparatus as recited in claim 1, wherein a metal layer having catalytic activity is fixedly provided on both the surface of the rotating blade and the inner wall of the housing.

22. The gas-cleaning apparatus as recited in claim 1, wherein said fan is constructed and arranged to be rotatable by the pressure of the intake gas blown through the intake vent.

23. The gas-cleaning apparatus as recited in claim 1, wherein said fan is rotated by a power source.

24. The gas-cleaning apparatus as recited in claim 1, wherein a deoxidizing mechanism for removing oxygen is provided between said intake vent and said fan.

25. The gas-cleaning apparatus as recited in claim 24, wherein said deoxidizing mechanism is constituted by pipes filled with silver powder and equipped with a heating means.

26. The gas-cleaning apparatus as recited in claim 24, wherein said deoxidizing mechanism comprises a first electrode made of stabilized zirconia, and a second electrode made of copper.

27. The gas-cleaning apparatus as recited in claim 24, wherein said deoxidizing mechanism is made of copper.

28. The gas-cleaning apparatus as recited in claim 27, wherein said deoxidizing mechanism is made of powdery copper.

29. The gas-cleaning apparatus as recited in claim 27, wherein said deoxidizing mechanism has a honeycomb structure composed of an assembly of a plurality of cells, each cell having a copper-plated inside wall.

30. The gas-cleaning apparatus as recited in claim 24, wherein said deoxidizing mechanism is reduced, after deoxidation treatment, by heat of the gas itself.

31. The gas-cleaning apparatus as recited in claim 24, wherein said deoxidizing mechanism is constituted by an anode, a cathode facing said anode, a means for applying an electric voltage across the anode and cathode, and an element selected from the group consisting of zinc, zinc oxide, indium and indium oxide provided between the anode and the cathode.

32. The gas-cleaning apparatus as recited in claim 1, further comprising a deoxidizing mechanism constituted by heatable silver wires located between the intake vent at the exhaust vent.

33. The gas-cleaning apparatus as recited in claim 32, wherein said wires are in a meshed form.

34. The gas-cleaning apparatus as recited in claim 1, further comprising:

first and second deoxidizing units in communication with the intake vent, each deoxidizing unit containing a deoxidizing mechanism for removing oxygen, said deoxidizing units being provided in respective passageways located upstream of the at least one fan;

changing means for selecting one of (a) a first state wherein the passageway of said first deoxidizing unit is opened to permit flow of gas whereas the passageway of said second deoxidizing unit is closed and (b) a second state wherein the passageway of said second deoxidizing unit is opened whereas the passageway of said first deoxidizing unit is closed; and pressure-reducing means which reduces pressure of the second unit in the first state and reduces pressure of the first unit in the second state.

35. The gas-cleaning apparatus as recited in claim 34, further comprising a heating means which heats the second deoxidizing unit in the first state and heats the first deoxidizing unit in the second state.

36. The gas-cleaning apparatus as recited in claim 34, further comprising a hydrogen-supplying means provided with a hydrogen-occluding alloy for supplying hydrogen to the first and second deoxidizing means, said hydrogen-supplying means in communication with the second deoxidizing unit in the first state and in communication with the first deoxidizing unit in the second state.

37. The gas-cleaning apparatus as recited in claim 1, further comprising:

first and second deoxidizing units in communication with the intake vent, each deoxidizing unit containing a deoxidizing mechanism for removing oxygen, said deoxidizing units being provided in respective passageways located upstream of the at least one fan;

changing means for selecting one of (a) a first state wherein the passageway of said first deoxidizing unit is opened to permit flow of gas therethrough whereas the passageway of said second deoxidizing unit is closed and (b) a second state wherein the passageway of said second deoxidizing unit is opened to permit the flow of gas therethrough whereas the passageway of said first deoxidizing unit is closed; and a heating means which heats the second deoxidizing unit in the first state and heats the first deoxidizing unit in the second state.

* * * * *